(No Model.)
W. DALENBERG & C. VERDUIN.
CAR STEP EXTENSION.
No. 481,009. Patented Aug. 16, 1892.
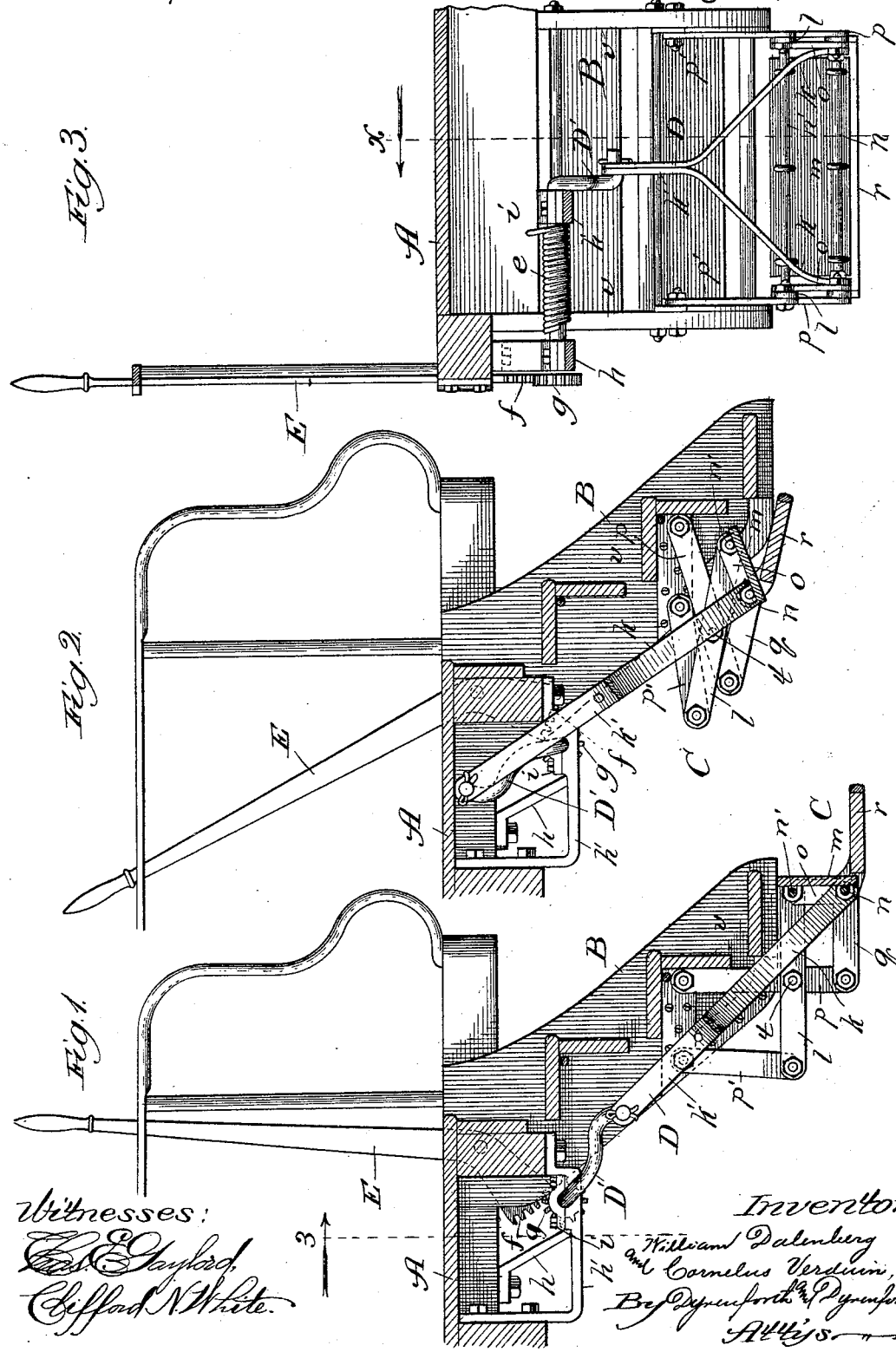
Witnesses:
Chas. E. Gaylord
Clifford N. White
Inventors:
William Dalenberg
and Cornelus Verduin,
By Dyrenforth & Dyrenforth,
Att'ys

UNITED STATES PATENT OFFICE.

WILLIAM DALENBERG AND CORNELUS VERDUIN, OF SOUTH HOLLAND, ILLINOIS.

CAR-STEP EXTENSION.

SPECIFICATION forming part of Letters Patent No. 481,009, dated August 16, 1892.

Application filed April 18, 1892. Serial No. 429,670. (No model.)

*To all whom it may concern:*

Be it known that we, WILLIAM DALENBERG and CORNELUS VERDUIN, citizens of the United States, residing at South Holland, in the county of Cook and State of Illinois, have invented a new and useful Improvement in Car-Step Extensions, of which the following is a specification.

The object of our invention is to provide for a car (including a railway-coach and other vehicle having for ingress to or egress from it a step or steps) a step extension in the form of one or more steps adapted to be unfolded to extend the fixed step or flight downward nearer to the ground, thereby to facilitate access to or alighting from the car; and it is our purpose to provide a construction of such step extension which shall be readily folded and unfolded and when folded shall occupy a position directly behind the fixed steps and shall be self-locking in both its folded and unfolded or extended positions.

Our invention is illustrated as applied to the steps of a railway-car platform in the accompanying drawings, in which—

Figure 1 is a broken view in sectional elevation of a car-platform having the steps leading from one side thereof provided with our improved extension shown in its unfolded position; and Fig. 2 is a similar view of the same, showing the extension in its folded position, both sections being taken at the line *x* on Fig. 3 and viewed in the direction indicated by the arrow. Fig. 3 is a section taken at the line 3 on Fig. 1 and viewed in the direction indicated by the arrow.

A denotes a platform of a car, and B the flight of steps or stairway, of usual or any suitable construction, at one side of the platform.

For convenience we show the steps and our improvement thereon provided only on one side of a car-platform, as that is sufficient for the purpose of explanation, and the provision thereof at the opposite side is merely a duplication, though of course the operating mechanism could be readily arranged to operate our improved extension at each side of the platform simultaneously, either to extend or fold both extensions simultaneously, if desired, or, and more properly, to fold and unfold the two alternately. The construction of our improved step extension, however, is the same for each side of the platform. Hence description thereof on one side of the same will suffice.

C denotes the folding step extension to which our improvement relates, and we show it as having but one step $r$, though the number may be increased, as desired or required, without thereby departing from our invention. Ordinarily, however, especially for railway-car purposes, a single-step extension will suffice.

The step $r$ is provided at each of its opposite ends with a rigid arm $q$, the arms $q$ extending backward far enough to be pivotally connected at their rear ends with the lower ends of arms $p$, pivotally suspended, respectively, from the inner sides of the opposite side pieces $v$ of the stairway B. Links $o$ extend from the arms $q$ from near the rear edge of the step $r$ at its opposite ends, and are connected at their lower and upper ends, respectively, by rods $n$ and $n'$, journaled in the links, and on which may be provided a riser $m$. A pair of pivotal arms $p'$, like the arms $p$, but shorter, depend behind the latter from the opposite stairway sides $v$, and have pivotally connected with their lower ends the rear ends of bars $l$, extending across the arms $p$, to which they are pivoted at $t$ and pivotally connected at their opposite or forward ends with the rods $n'$.

The mechanism thus described in detail affords a species of toggle-lever or lazy-tongs support for the step $r$ on the stairway B, whereby it may be collapsed or folded to withdraw the step upward and backward behind the stairway, as represented in Fig. 2, and extended to protrude it the proper distance below and beyond the lowermost step thereof, as represented in Fig. 1.

The particular means we provide for operating the collapsible support for the step $r$ comprise a bifurcated arm D, having its branches $k$ journaled at their ends on the rod $n$ against the links $o$, and suspended at its tail-piece $k'$ from a crank D', having its spindle $i$ journaled in horizontal position on brackets $h$ and $h'$ on the bottom of the car-platform, the outer end of the spindle, which projects beyond the rear of the platform, carrying a pinion $g$, engaged by a rack $f$ on the end of an operating-lever E, extending into accessible position on the platform, and which may be provided with means (not shown) for locking it. If desired, a coiled spring $e$ may surround the spindle $i$ and be arranged to be set by turning the spindle to fold the step $r$, whereby its resilience will assist the unfolding operation.

From the foregoing description the operation will be understood to consist in turning the lever E in one direction to lower the crank D', which forces the bifurcated arm D downward and outward, and thereby unfolds the toggle-lever mechanism to cause it to protrude the step $r$ in proper position below the stairway B, and in turning the lever in the opposite direction to raise the crank, and thereby pull backward and upward the bifurcated arm, and through the medium of the latter withdrawing the toggle-lever mechanism and step $r$, at the same time folding them behind the stairway. It will also be noticed that when the crank D' moves to its highest and lowest positions it passes the center, in the first instance locking the step-support in its extended position, and in the last-named instance locking it in its folded position, and this function of the operating mechanism is an important feature in our improvement.

The rigidity of the arm D, particularly in its position of protruding the step $r$, may be such as to hold the step with sufficient firmness to render any lock unnecessary, and it affords what may be included in the term an "adjustable brace."

We do not consider our invention to lie in and we do not wish to be understood as limiting it to the mere details of our construction, which may be variously departed from without thereby materially, if at all, depriving the invention of its advantages.

What we claim as new, and desire to secure by Letters Patent, is—

1. In combination with the platform and a stairway of a car, a folding extension for the stairway, having a toggle-lever support carrying a step and operating when folded to raise and support the step behind the stairway and when extended to protrude the said step beyond the lowermost step of the stairway, and means for operating the folding extension from the platform, substantially as described.

2. In combination with the platform and stairway of a car, a folding extension for the stairway, having a toggle-lever support carrying a step and operating when folded to raise and support the step behind the stairway and when extended to protrude the said step beyond the lowermost step of the stairway, and means for operating the said folding extension from the platform and having an adjustable brace connected with the toggle-lever support, substantially as described.

3. In combination with the platform and stairway of a car, a folding extension for the stairway, having a toggle-lever support carrying a step and operating when folded to raise and support the step behind the stairway and when extended to protrude the said step beyond the lowermost step of the stairway, a crank journaled on the platform, an operating-lever connected with the crank, and a locking-brace connecting the crank with the said toggle-lever support, substantially as described.

4. In combination with the platform and stairway of a car, a folding extension C for the stairway, formed with pivotal arms $p$ and $p'$ depending from the stairway, pivotal cross-bars $l$, links $o$, and a step $r$, having arms $q$ at its opposite ends pivotally connected with the links $o$ and arms $p$, whereby the said extension may be folded behind the stairway and extended to protrude the step $r$ beyond the lowermost step of the stairway, and means for operating the folding extension from the platform, substantially as described.

5. In combination with the platform and stairway of a car, a folding extension C for the stairway, formed with pivotal arms $p$ and $p'$ depending from the stairway, pivotal cross-bars $l$, connected links $o$, and a step $r$, having arms $q$ at its opposite ends pivotally connected with the links $o$ and arms $p$, whereby the said extension may be folded behind the stairway and extended to protrude the step $r$ beyond the lowermost step of the stairway, a crank D', journaled on the platform, an operating-lever E, connected with the crank, and a brace D, connecting the crank with the links $o$, the whole being constructed and arrranged to operate substantially as described.

WILLIAM DALENBERG.
CORNELUS VERDUIN.

In presence of—
M. J. FROST,
J. N. HANSON.